United States Patent [19]
Adams

[11] Patent Number: 4,865,360
[45] Date of Patent: Sep. 12, 1989

[54] MODULAR DIFFERENTIAL PRESSURE TRANSMITTER/MANIFOLD FOR A FLUID CONVEYING PIPELINE

[76] Inventor: Donald L. Adams, P.O. Box T, Tulia, Tex. 79088

[21] Appl. No.: 183,009

[22] Filed: Apr. 18, 1988

Related U.S. Application Data

[62] Division of Ser. No. 871,560, Jun. 6, 1986, Pat. No. 4,738,276.

[51] Int. Cl.$^4$ .................. F16L 19/00; F16L 23/00; F16L 41/00; F16L 41/08
[52] U.S. Cl. ................... 285/158; 285/137.1; 285/363; 285/379
[58] Field of Search ............... 285/158, 189, 363, 405, 285/343, 350, 379

[56] References Cited

U.S. PATENT DOCUMENTS

| | | | |
|---|---|---|---|
| 1,890,006 | 12/1932 | Swift | 285/158 |
| 1,956,683 | 5/1934 | Hewitt | 285/158 X |
| 2,826,436 | 3/1958 | Hupp | 285/158 |
| 3,404,903 | 10/1968 | Frantz | 285/189 X |
| 3,498,643 | 3/1970 | Reiss | 285/189 |
| 3,545,793 | 12/1970 | Graffy | 285/158 |
| 4,049,296 | 9/1977 | Harrison | 285/379 X |
| 4,222,590 | 9/1980 | Regan | 285/363 X |
| 4,229,923 | 10/1980 | Kojima | 285/158 X |
| 4,426,103 | 1/1984 | Sundholm | 285/158 X |
| 4,512,148 | 4/1985 | Jacobson | 285/158 X |

*Primary Examiner*—Randolph A. Reese
*Assistant Examiner*—Paul M. Frechette
*Attorney, Agent, or Firm*—Daniel V. Thompson

[57] ABSTRACT

A transmitter manifold with integral transducer for measuring the differential pressure of a fluid conveying pipeline is provided. Interface modules are provided to provide for adaptability to a variety of user requirements. A sealing arrangement for the interface modules is also provided. In preferred form, the interface module includes a body having a flange portion and a neck portion extending outwardly from the flange portion, with the flange portion including holes for engagement with bolts threaded into the transmitter manifold.

5 Claims, 7 Drawing Sheets

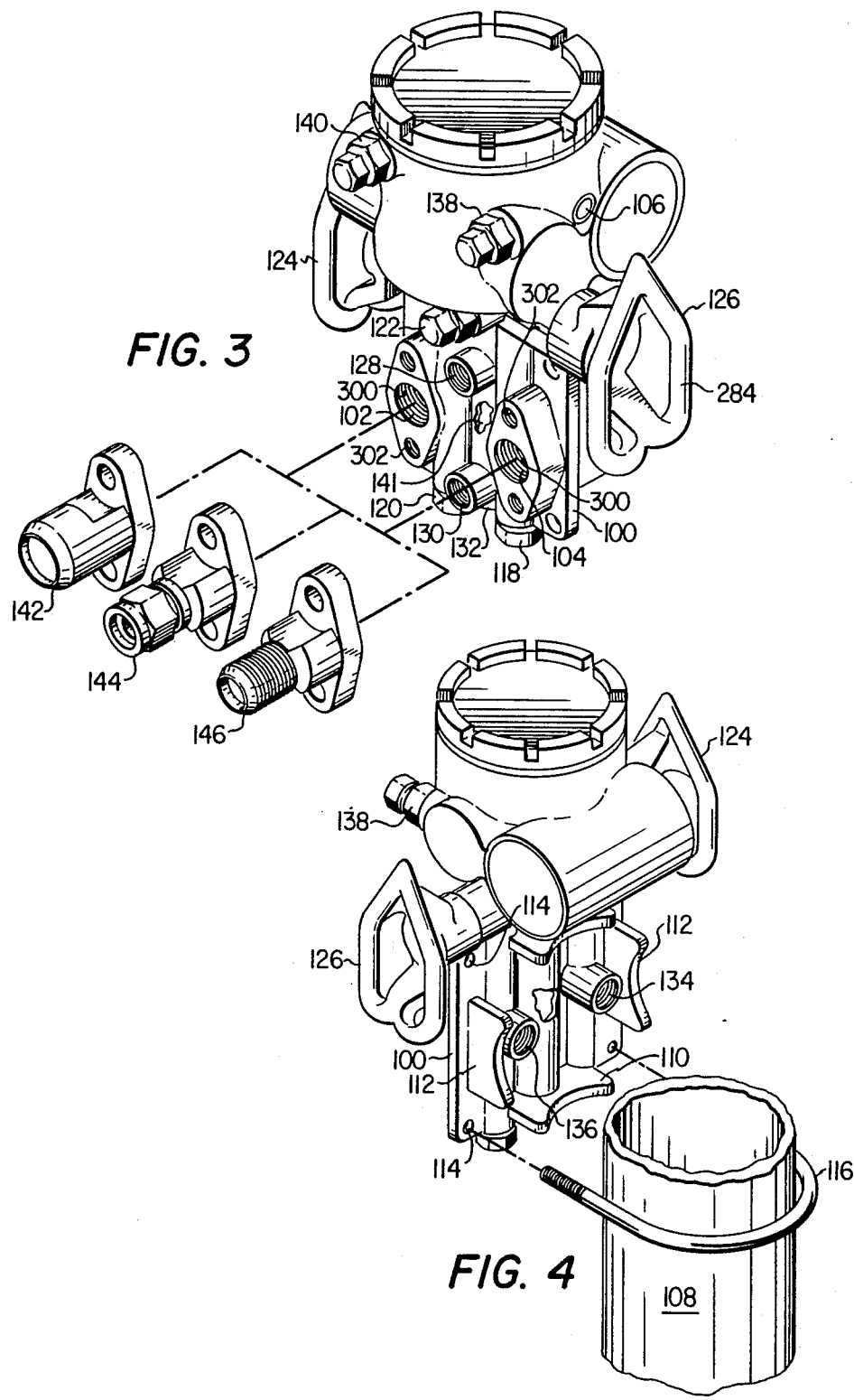

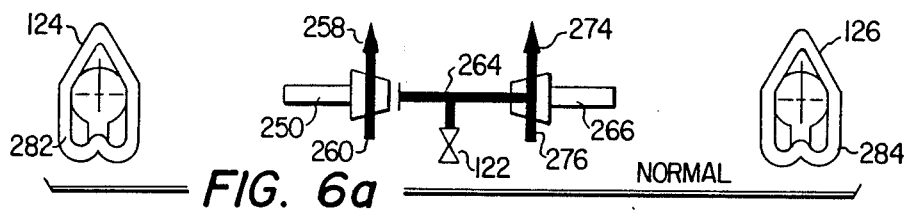
FIG. 6a — NORMAL
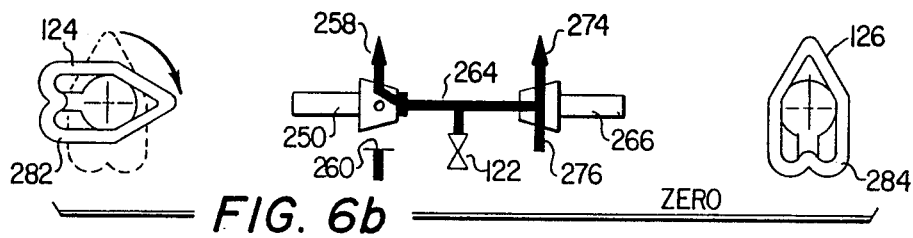
FIG. 6b — ZERO
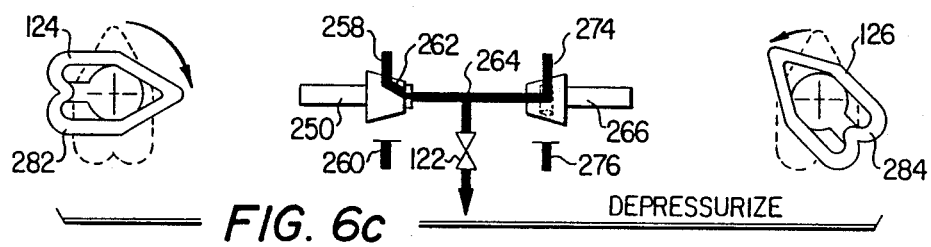
FIG. 6c — DEPRESSURIZE
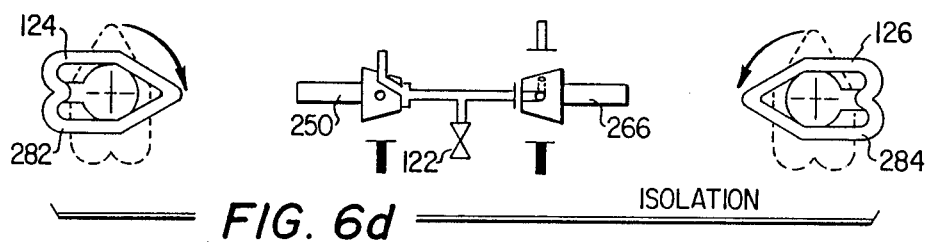
FIG. 6d — ISOLATION
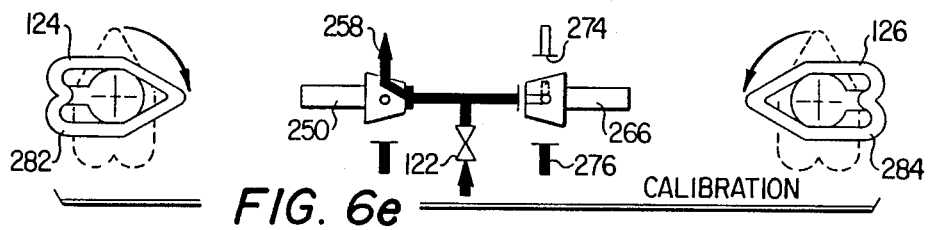
FIG. 6e — CALIBRATION
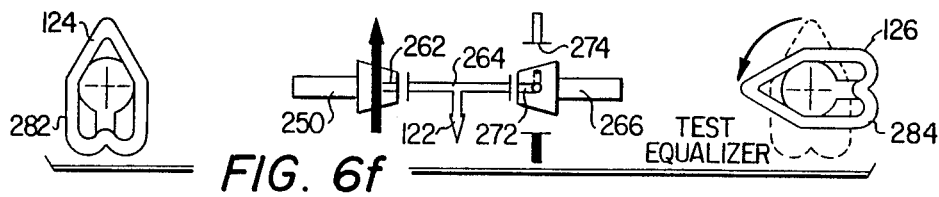
FIG. 6f — TEST EQUALIZER

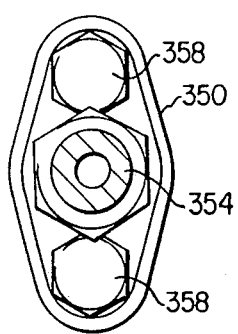
FIG. 10a
PRIOR ART
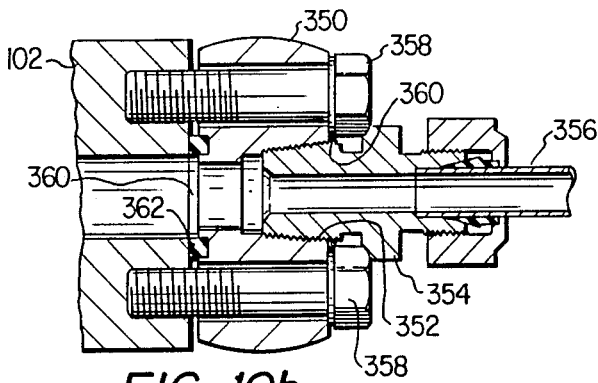
FIG. 10b
PRIOR ART
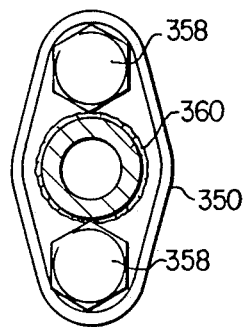
FIG. 10c
PRIOR ART
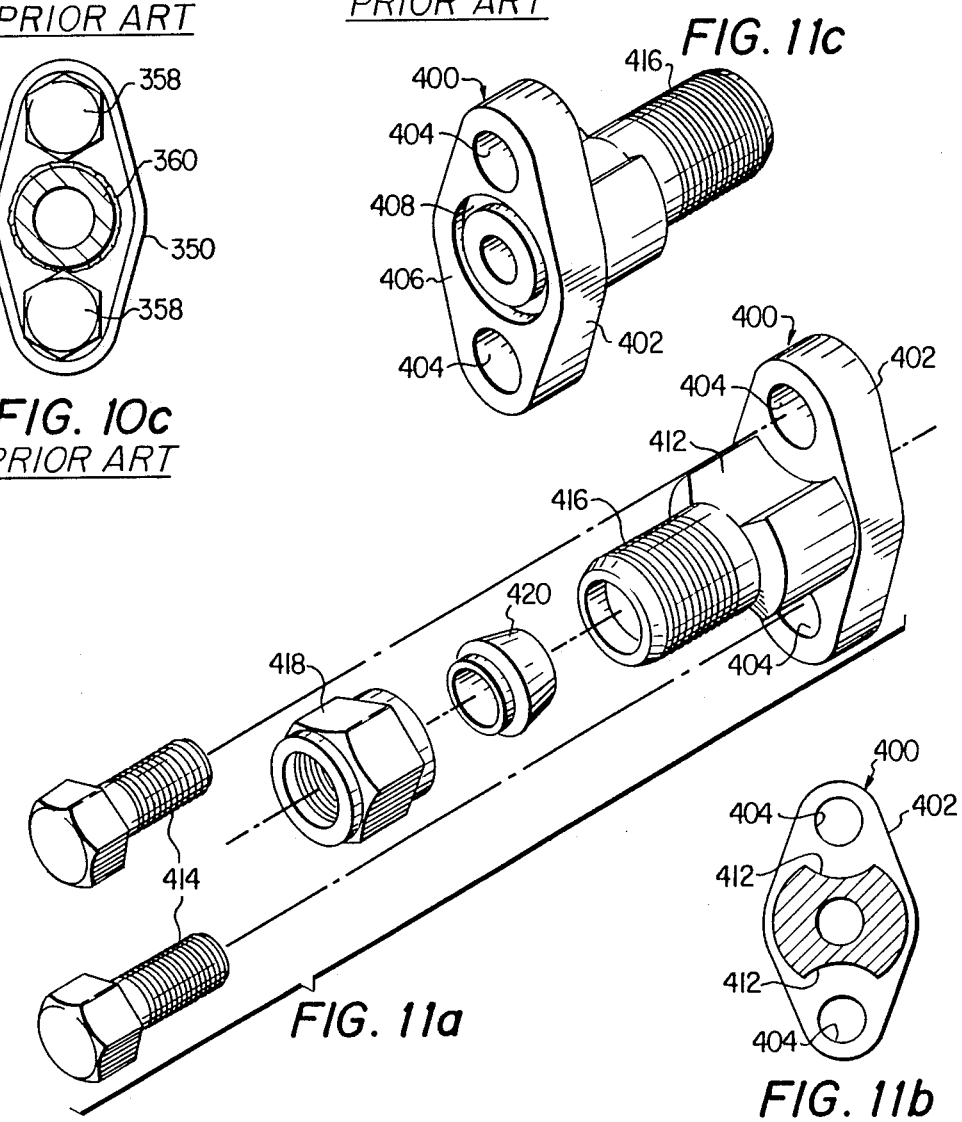
FIG. 11a
FIG. 11b
FIG. 11c

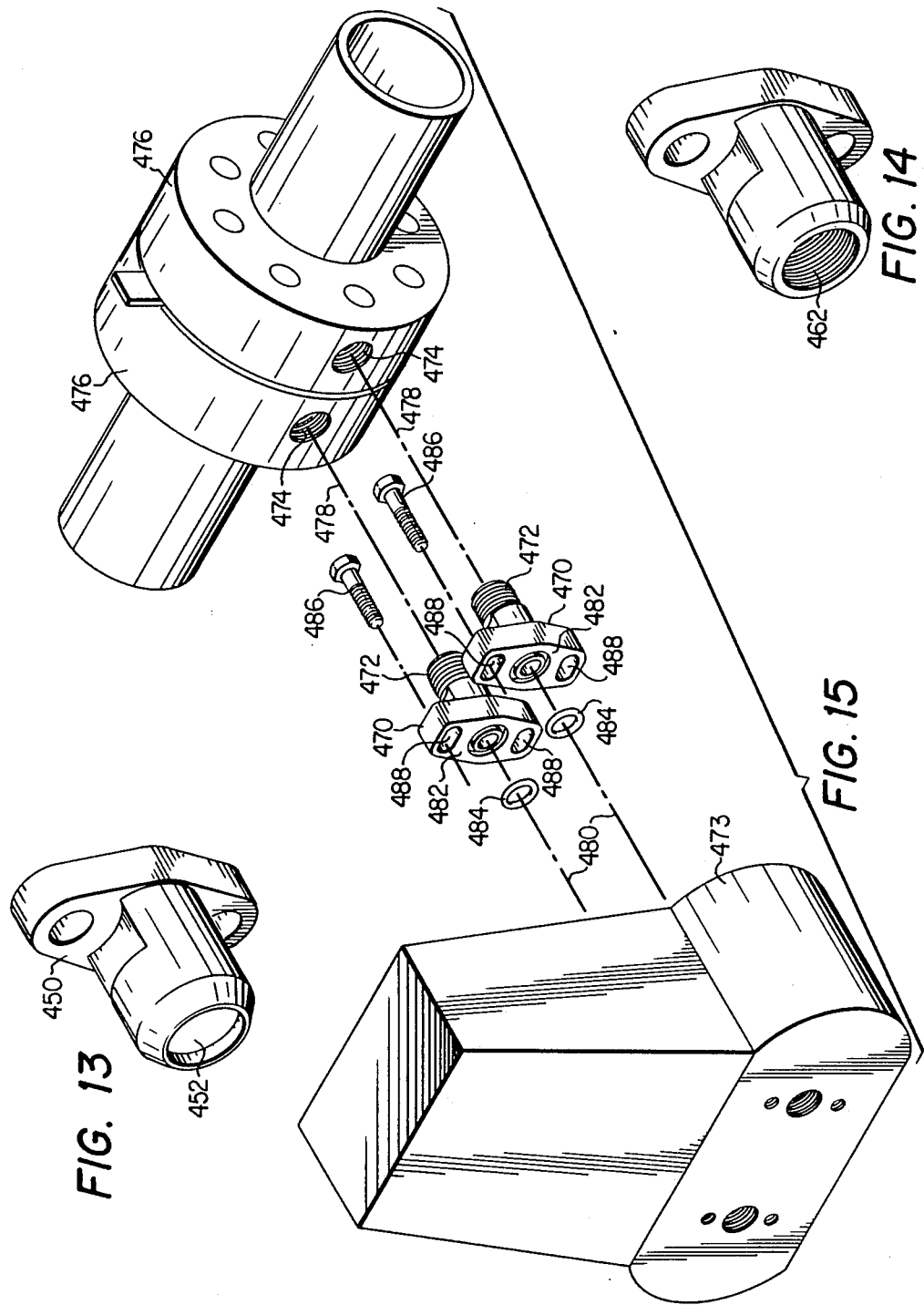

1

MODULAR DIFFERENTIAL PRESSURE TRANSMITTER/MANIFOLD FOR A FLUID CONVEYING PIPELINE

CROSS-REFERENCE TO RELATED APPLICATION

This application is a divisional application of Ser. No. 871,560, filed June 6, 1986, now U.S. Pat. No. 4,738,276, entitled "Modular Differential Pressure Transmitter/Manifold for a Fluid Conveying Pipeline", and issued Apr. 19, 1980.

FIELD OF INVENTION

This invention relates to valve manifolds for differential pressure transmitters.

BACKGROUND OF THE INVENTION

Differential pressure transmitters, as shown in FIG. 1, have long been known in the art. Typically, a differential pressure transmitter system as shown in FIG. 1 is used with a pipeline 10 in which there is a flowing media which needs to be measured as to flow rate. A very accurate and economical method of measuring flow is to install an orifice 12 in the pipeline 10. Orifice 12 causes a differential pressure as media is forced through the small opening of orifice 12, which differential is sensed by a transmitter 14 through process pressure signal lines 16 and 18. The amount of differential pressure developed is a square root function of the flow rate. Consequently, by knowing the size of the precision hole in the orifice plate, and by obtaining a precision measurement of the differential pressure, the flow rate can be calculated with greater than 1% accuracy.

FIG. 2 illustrates the transmitter system shown in FIG. 1 in greater detail. It is conventional to provide a valve manifold 50 to interface with the two process pressure signal lines from the orifice 12 by utilizing gaskets 56, adapters 58 and nipples 60. Transmitter 14 is then interfaced with the above valve manifold 50 with gaskets 68 and four bolts 72 (one bolt shown in FIG. 2). In addition, a mounting bracket 74 is provided with four bolts 76 (one bolt shown in FIG. 2) to bolt onto the transmitter 14. Transmitter 14 is clamped onto a 2" pipe rack 78 with U-bolt 80, which physically supports the hardware.

SUMMARY OF THE INVENTION

The present invention provides a novel transmitter/manifold for sensing a differential pressure in a fluid conveying pipeline. In one aspect of the invention, a valving arrangement is provided that allows for automatic sequencing of the valves for all service functions. In another aspect of the invention, means for heating the transmitter/manifold is provided to retain stability in sub-freezing conditions. In yet another aspect of the invention, interface modules are provided to provide for adaptability to a variety of user requirements. In still another aspect, the invention provides a novel sealing arrangement for the interface modules.

BRIEF DESCRIPTION OF THE DRAWINGS

A more complete understanding of the invention and its advantages will be apparent from the following Detailed Description taken in conjunction with the accompanying Drawings in which:

FIG. 3 is a partially exploded perspective view of a transmitter/manifold constructed in accordance with the present invention;

FIG. 4 is the transmitter/manifold of FIG. 3 rotated 90°;

FIGS. 6a-f are schematic representations of the valving of the present invention;

FIGS. 10a, 10b and 10c are views illustrating prior art adapter apparatus;

FIGS. 11a, 11b and 11c are views illustrating the modular adapters of the present invention;

FIG. 13 is a perspective view of an alternate embodiment of the adapter of the present invention;

FIG. 14 is a perspective view of another alternate embodiment of the adapter of the present invention;

FIG. 15 is an exploded perspective view of another embodiment of the adapter of the present invention along with a pipeline and transmitter;

DETAILED DESCRIPTION OF THE PREFERRED EMBODIMENT

Figures 1, 2:
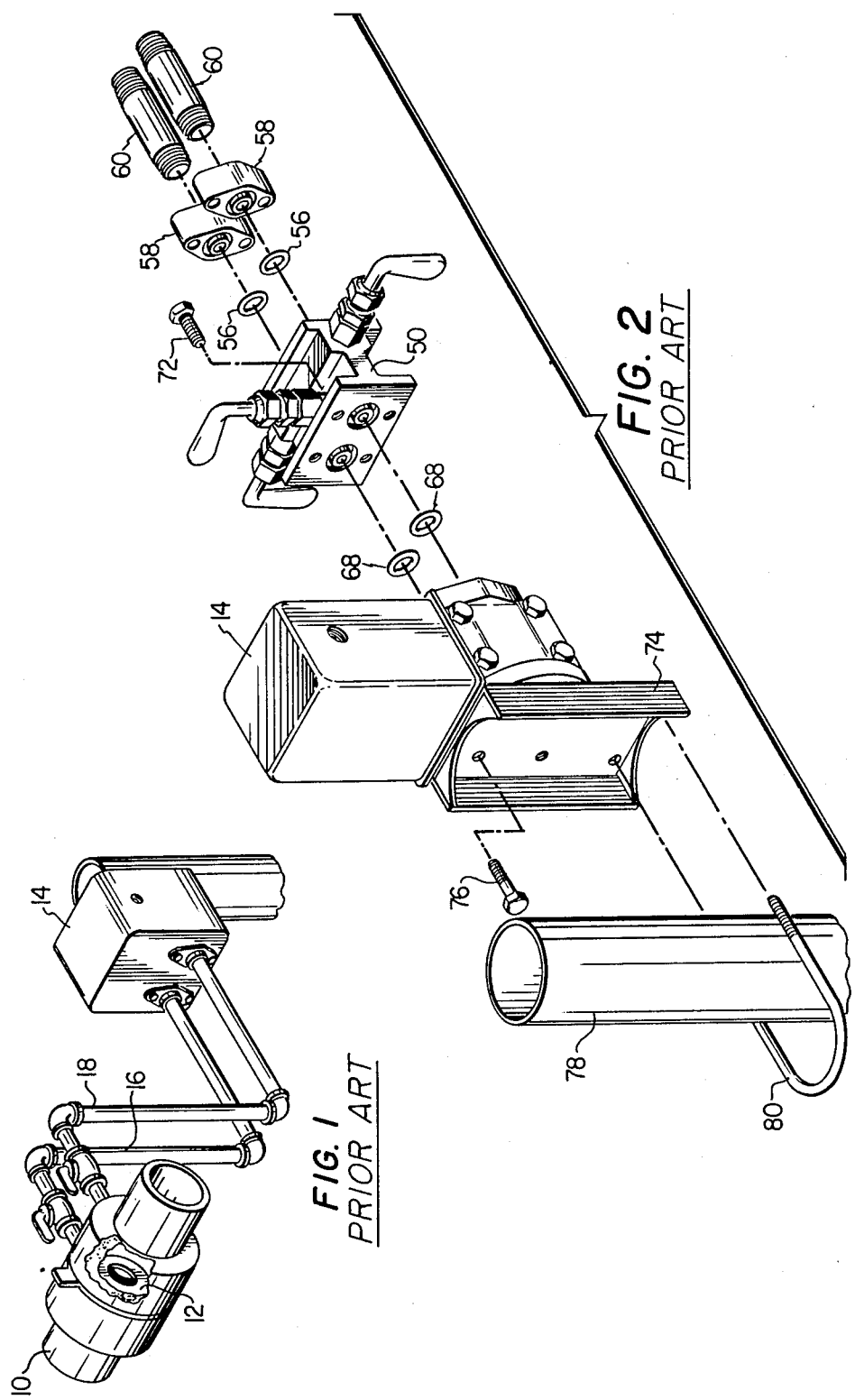
FIG. 1 is a perspective view of a prior art transmitter and interface apparatus.
FIG. 2 is an exploded perspective view of the apparatus of FIG. 1.

I have invented an improved differential pressure transmitter/manifold that completely eliminates the unwieldly and expensive flow transmitter hardware package as explained above in connection with FIGS. 1 and 2. My invention makes it possible to eliminate all the interface hardware (14 parts) between the two process signal lines 16 and 18 and the user supplied pipe rack 78. The invention loses very little of the functionalism of the multipiece prior art system and gains considerably in compactness and lower costs, and it eliminates the need for most of the parts shown in FIGS. 1 and 2.

A very important aspect of the invention is that the physical looks and functionalism of the prior art manifold valve hardware to which the user is accustomed is maintained. This is an important consideration necessary to user acceptability. Thus, the instrument technician can approach a familiar looking piece of equipment and has only to learn that the instrument of the present invention includes the components of the flow transmitter within its body. The final "key to acceptability" is that he will learn as he services my instrument, or studies its literature, that by elimination the many interface parts listed above and shown in FIGS. 1 and 2 my transmitter/manifold loses nothing in functional ability, service convenience, or reliability.

The improved transmitter system, as shown in FIGS. 3 and 4, includes a one-piece body 100 with process pressure connections 102 and 104 which are the user input interfaces. The system output interfaces to the user are an electrical signal out port 106 and pipe rack 108 on which the transmitter is mounted.

Body 100 includes saddles 100 to accommodate a vertical 2" pipe stand 108 and saddles 112 to fit any horizontal 2" pipe stand. Also included in the body are bolt holes 114 to receive U-bolts 116 to clamp body 100 to the user's pipe stand 108 without requiring a separate bracket. Body 100 also includes plugged ports 118 and 120 which can be used as purge or drain ports. The plugged vent port 122 is also included and is used in simultaneously venting the pressure on both sides of the transmitter/manifold prior to servicing the sensor. The transmitter/manifold also includes a blocking valve 126 and a zeroing valve 124 which, as explained below in connection with FIGS. 6a-f, allow the service person to select any of the six service functions that would ever be required. Also provided in body 100 are ports 128, 130 and 132, which provide access, as explained below in connection with FIG. 5, to steam heat or an electrical heat system to control the temperature of the transmitter/manifold. Bosses 134 and 136 provide a means of installing rod-out valves (as in my U.S. Pat. No. 4,391,289) to be used to rod-out (unplug) the connections 102 and 104.

The provision of saddles 110 and 112 is an important feature of the invention in that they serve as an excellent means to rigidly anchor the transmitter/manifold on a 2" pipe. For extra versatility, the system works equally well on horizontal 2" pipe as well as vertical. Holes 114 are of equal spacing such that U-bolt 116 can be installed either vertically or horizontally to mate saddles 110 of 112. Saddles 110 are located to position the body away from the pipe support enough to minimize heat loss to the supporting structure. Often the transmitter/manifold will be heated to avoid freeze-ups during cold weather. Saddles 112 are located to allow valve handles and other parts to clear the long 2" pipe, and again spaced out to reduce heat loss.

Ports 118 and 120 are located at the lowest point in the system and thus can be used to drain any liquid collected in the system prior to servicing or recalibrating the system. They can also be used as purge ports when encountering a particularly dirty or plugging service, in which it is common practice to induce a small amount of clean media into the system close to the manifold valves. This very small flow goes toward the dirty process media to keep solid particles from migrating into connections 102 and 104 and causing them to become plugged.

Ports 138 and 140 have a dual purpose. When the transmitter/manifold is in a liquid service, it is mandatory to remove all vapor from the system. If one side of the transmitter/manifold or one of the connections 102 or 104 coming to the transmitter/manifold had a bubble of vapor trapped in it, the liquid head pressure on that side would be biased and a false differential pressure signal would result. Ports 138 and 140 are located at the highest point of the transmitter/manifold porting, so all the vapor is removed when using these ports as vent ports. These ports 138 and 140 are also positioned at equal elevations, and one on each end of the differential pressure measuring transmitter/manifold. Thus, they are located where a technician would connect his calibration kit to recalibrate the transmitter/manifold.

Ports 128 and 130 are part of an integral heating system, located adjacent the mounting saddles 110 and 112 which normally would be a major heat loss to the system. Thus, steam injected into port 128 would make up heat loss through saddles 110 and 112 and allow surplus heat to migrate upward to keep the remainder of the system warm. Between port 128 and port 130 is a condensing chamber 141, which in the preferred embodiment has a surface area of 0.122 square inches. Using 40 psi steam and a fiberglass-foam enclosure, this area provides protection for the system in a $-25°$ F. temperature with a 15 mph wind.

Ports 102 and 104 can each be mated with one of interface adapters 142, 144 or 146, as will be described in more detail below in connection with FIGS. 11a-15.

Figure 5:
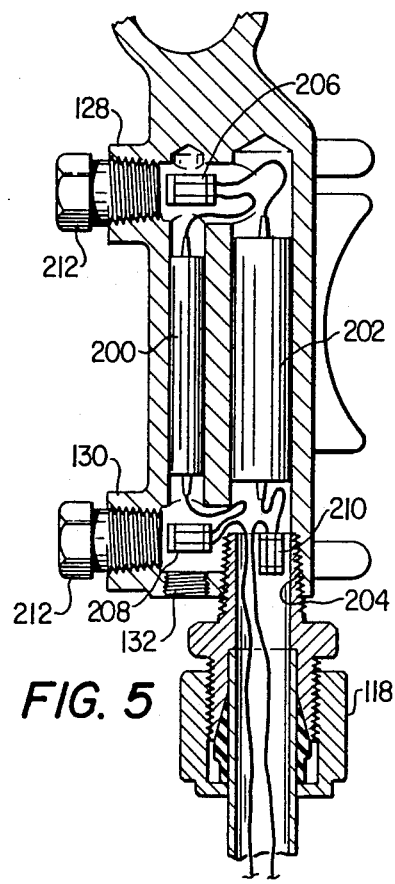
FIG. 5 is a partially broken away side view of the transmitter/manifold of the present invention.

FIG. 5 illustrates an electric heating system which may be used as an alternate to steam heating. This system has dual purposes: (1) to supply a compact and economical means for heating the transmitter/manifold to avoid a freeze-up, and (2) to allow thermostatic control of the temperature changes of the transmitter/manifold. By controlling the temperature, much greater accuracy can be maintained in that sensors and electronics are all grossly affected by temperature change. This system includes, in the preferred embodiment, a $\frac{1}{4}''$ round, 200 watt, 120 volt cartridge heater element 200 which is hermetically sealed and inserted through port 132 into the boss built into body 100 between ports 128 and 130. A bimetallic thermostat 202 is inserted into boss 204 to control the temperature to a preset temperature. Ports 128, 130, and 204 are located such that wiring connections 206, 208 and 210 between the heater, thermostat and the power loads can be made inside of such ports as shown. Either ports 130 or 240 (as shown) can become the port through which power is brought to the system. The remaining ports are plugged with pipe plugs 212 to isolate the heating system from atmosphere.

Referring now to FIGS. 6a-f, another important feature of the new transmitter/manifold is the design and porting of zeroing valve 126, blocking valve 124, and vent valve 122, which allow the service technician to select any of six service functions. As shown in FIGS. 6a-f respectively, the six service modes available are: NORMAL, ZERO, DEPRESSURIZATION, ISOLATION, CALIBRATION, and TEST E-UALIZEOR. An important feature of this invention is not just the ability to select these service functions, but that they are automatically selected in an exact logical order. The sequence of port closing and opening is automatic such that the system actually protects the operator from the improper sequencing problems encountered in the prior art manifolds that have a group of many two-way (open or closed) valves.

Figure 7:
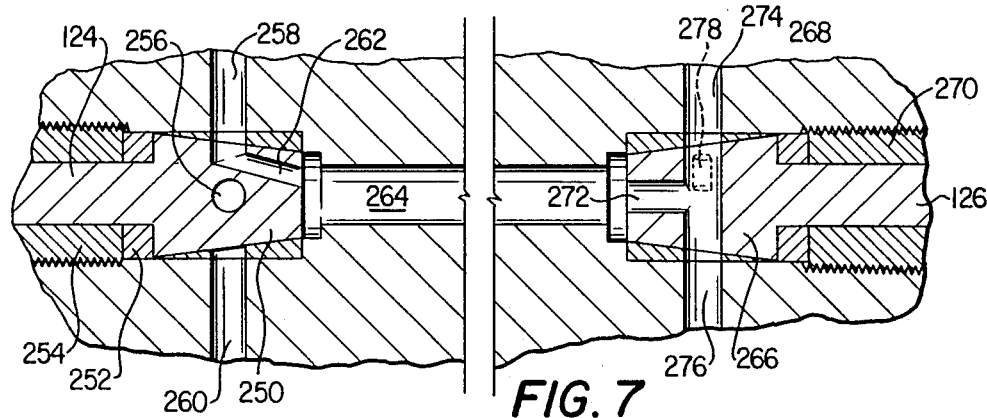
FIG. 7 is a partially broken away detailed side view of the valving of the present invention.

Referring now to FIG. 7, zeroing valve 124 includes zeroing plug 250, packing 252 and packing nut 254. Zeroing plug 250 has a straight-through passageway 256, which connects high pressure instrument passageway 258 and high pressure input passageway 260 in the normal position. In the zeroing position, shown in FIG. 7, zeroing passageway 262 connects high pressure instrument passageway 258 to equalizer passageway 246, while high pressure input passageway 260 is blocked.

Figure 8:
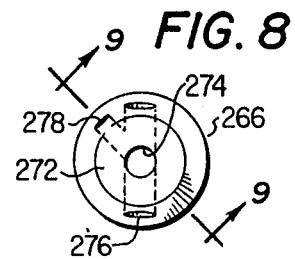
FIG. 8 is an end view of a blocking plug constructed in accordance with the present invention.
Figure 9:
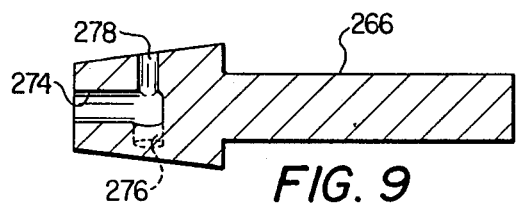
FIG. 9 is a sectional view taken along the lines 9—9 in FIG. 8.

Similarly, as shown in FIGS. 7, 8 and 9, blocking valve 124 includes blocking plug 26, packing 268 and packing nut 270. Blocking plug 266 includes a "T"-shaped passageway 272 which connects in the normal position equalizer passageway 264, low pressure instrument passageway 274 and low pressure input passageway 276, as shown in FIG. 7. Blocking plug 266 also includes a relatively small depressurize passageway 278 offset approximately 45° from a branch of the "T"- shaped passageway 272 as shown in FIGS. 8 and 9. In the depressurize position, depressurize passageway 278 and "T"-shaped passageway 272 connect the low pressure instrument passageway 274 and equalizer passageway 264, but low pressure input passageway 276 is blocked. In the blocked position, both the low pressure input passageway 276 and low pressure instrument passageway 274 are blocked.

FIGS. 6a-f show the sequence of porting as valves 124 and 126 are rotated to the various positions. Special arrowhead-shaped handles 282 and 284 (FIGS. 3 and 6a-f) retain the "pointing the direction of flow" feature of prior art lever handles while removing the objection of the susceptibility of the lever handles being accidentally rotated by a person kicking, bumping or snagging the handle.

NORMAL MODE (FIG. 6a). In the NORMAL MODE, both handles point in the direction of straight-through flow similar to the convention set by lever handles on ball valves. High pressure input passageway 260 of zeroing valve 124 is open and connected to high pressure instrument passageway 258, which allows pressure to pass from process pressure to the high side of the instrument. Zeroing passageway 262 is closed which closes the equalizer passageway and allows pressure on the high pressure side of the instrument to be different than the pressure on the low pressure side of the instrument. In the NORMAL MODE of the blocking valve 126, passageways 264, 274 and 276 are all interconnected as shown by "T"-shaped passageway 272.

ZEROING MODE (FIG. 6b). Referring now to FIG. 6b, to prepare the instrument for zeroing, the operator selects the ZERO MODE by rotating handle 282 90° to the right. This blocks high pressure input passageway 260 and opens high pressure instrument passageway 258 to equalizer passageway 264, thus putting the low process pressure of port 276 on both sides of the instrument. With the same pressure on both sides of the differential pressure instrument, its output should read zero. If it does not, the operator can adjust the instrument to do so by turning the zeroing screw supplied on all conventional flow transducers.

This invention protects the operator from improperly sequencing multiple valves when shifting from the NORMAL MODE to the ZERO MODE. As "ZERO" is dialed, high pressure input passageway 260 first closes and then high pressure input passageway 258 is opened to equalizer passageway 264. This prevents serious problems that can occur on systems using a two-way (open or closed) valve for high pressure input and another two-way valve for the equalizer connection. Specifically, the high pressure passageway is controlled by a simple on-off (two-way) valve, the low pressure passageway is controlled by an on-off valve, and the equalizer passageway is controlled by an on-off valve, such that three two-way valves are utilized in contrast to my two specialized valves. In the conventional system, it is possible and not unusual for the operator to open the equalizer valve before closing the high pressure valve, which allows fluid to flow from the high pressure input through the equalizer and into the low pressure instrument line.

DEPRESSURIZATION MODE (FIG. 6c). About 90% of the service functions performed are checking zero as described above, but if further service is required, the instrument must be depressurized. The porting again is sequenced automatically as the operator simply turns the blocking valve 126 to its first position as shown in FIG. 6c. Both sides of the instrument are then connected to the single vent valve 122 such that while high and low pressure input passageways 260 and 276 are closed, high and low instrument passageways 258 and 274, zeroing passageway 262, equalizer passageway 264 and "T"-shaped passageway 272 are in communication and connected to vent valve 122. Valve 122 can now be slowly opened to allow the pressure in the instrument to be relieved.

ISOLATION MODE (FIG. 6d). After the pressure is relieved, the next logical step is to continue turning the same handle 284 on around to its final stop 90° from normal, which blocks low pressure input and instrument passageways 276 and 274 and puts the instrument in ISOLATION MODE (FIG. 6d). The instrument can now be safely removed or replaced.

CALIBRATION MODE (FIG. 6e). If the operator wishes to do a field calibration on the instrument, he can put the instrument in the CALIBRATION MODE (FIG. 6e) from ISOLATION MODE by installing his calibration equipment to vent valve 122 and use it to control calibration pressures to the instrument. The porting is automatically set such that the signal coming into valve 122 from his calibrator will go through open zeroing passageway 262 and high pressure input passageway 258 into the high pressure side of the instrument.

A very important feature of this invention is the natural, logical sequence of turning handles 282 and 284 when servicing the instrument. The first step, regardless of what service function is to be performed, is to turn the zeroing valve handle 282 all the way against its only stop—which is "ZERO". Any additional service requires moving the operator's hand to the other handle 284 and turning it. The operator needs to pause at the "DEPRESSURIZE" position and open vent valve 122, then he continues turning that handle all the way against its "BLOCKED" stop for any further servicing. To return back in service, the sequence is simply reversed. He turns handle 284 back to its stop at "NORMAL". This puts the instrument back into the ZERO MODE, which means process pressure is returned to both sides of the transmitter/manifold simultaneously. It is very important to avoid putting pressure back on one side and then the other side, because the instrument can be strained and cause a loss of calibration—the very thing that was just set. With conventional three valve manifolds with two-way valves, there is nothing to protect the operator from making this mistake. With my invention, the porting sequencing is done automatically and always in the proper order. To continue on back to NORMAL MODE, the zeroing valve handle 282 is rotated in the only direction it will go, i.e., toward the stop at "NORMAL".

TEST EQUALIZER MODE (FIG. 6f). The sixth service mode provided is the TEST EQUALIZER MODE (FIG. 6f), which is entered into when the system is pressurized and both handles 282 and 284 are set to "NORMAL". The operator simply turns the blocking valve handle 284 to "BLOCKED". This closes the low pressure input and instrument passageways 274 and 276. Vent valve 122 is opened, and if media flows out of vent valve 122, this means that either zeroing passageway 262 or "T"-shaped passageway 272 is leaking into equalizer passageway 264. The service person may now tighten packing nut 254 (FIG. 7) as required, which is used on this valve design to control inter-port leakage as well as valve stem leakage. When leakage is stopped, he can be assured that high pressure will not leak to the low pressure side through the equalizer passageway 204 when the instrument is in operation.

Because the instrument of the present invention has two handles, the only mistake a service person can make is to turn the wrong handle first. This results in no harm and no change in the output signal he is monitoring. If he then makes another mistake and turns the other handle, still nothing happens and no harm of any kind is done. Now his only option is to turn both handles back and dial the correct valve to "ZERO". It is only then that the output signal he is watching will respond and go to near zero output.

In contrast, the commonly used three two-way valve manifold has eight possible combinations of open and shut valves which the operator could try. Of the eight, only one combination is right. Three combinations may look right, but are wrong. One combination, all valves open, would seem logically right and would look right on the output signal, but would cause a gross zero misadjustment if used, and it could cause damage to the transducer as well as an unknowing removal of freeze protection fluid in the process signal lines. When trying to get back to normal, four combinations would seem right by looking at the output, but be wrong. In summary, an operator better know what he is doing while operating a common three two-way valve manifold, while my design is self-educating and completely forgiving.

Referring now back to FIG. 3, another feature of this invention relates to inlet interface ports 102 and 104 and interface adapters 142, 144 and 146. The inlet ports 102 and 104 are threaded with ½" NPT threaded inlets 300 and, in addition, both ports also have threaded bolt holes 302 to accommodate the bolting-on of an interface adapter 142, 144 or 146. This versatility designed into the instrument is important in that it relieves the purchasing agent of making detailed inlet interface decisions at the time of purchase, but it still leaves open the option for the user to choose any of the interface adapters he wishes or to use the cheapest method possible, which would be ½" NPT threaded inlets 300. Thus, any of the purchasing agent's and/or user's wishes, decisions, or lack of decisions about the type of inlet needed can be satisfied with this one transmitter/manifold inlet design augmented with the availability of adapters 142, 144 and 146.

FIGS. 10a-c illustrate the conventional connecting apparatus used in connecting process signal lines to flow or pressure measuring instruments. Such apparatus is used in various industrial control systems and is universally used in chemical plants, refineries, power plants and oil field installations. The two-bolt, oval flange adapter 350 in use today is identical in basic design to an adapter first used in the early 1940's. It is well known that there are problems caused by these prior art flanges—especially in light hydrocarbon service or in service with large temperature change cycles.

The inlet 352 of the flange 350 is threaded with ½" pipe thread. Most users presently use tubing instead of pipe, so male tubing connector fitting 354 is purchased to adapt 350 flange to accept tubing 356. Stainless steel and other exotic metals are used for flange 350 and fitting 354, so the threads easily gall as fitting 354 is being installed and leakage develops immediately or perhaps sometime later. Galling cannot be repaired and only grows worse as the installer tries to unscrew or tighten fitting 354 consequently, both flange 350 and fitting 354 are ruined and possibly dangerous fluid has leaked to atmosphere.

In addition, the two bolts 358 in the conventional apparatus are very closely spaced with respect to threads 352 and sometimes interference results between the heads of bolt 358 and the hex portion of fitting 354, as best shown in FIGS. 10a and 10b. This can cause a serious problem if the corners of the bolt head become damaged by an open wrench, because there is not enough room between the bolt heat and fitting to use a box end wrench.

A further problem relating to prior art apparatus concerns a construction requirement for some chemical plants and refineries that all threaded connections be "backwelded" along weld 360 as shown in FIG. 10c to prevent leakage. This specification is very close to impossible to accomplish on the prior art two bolt oval flange adapters, because there is just not enough room between the bolt heads and the inlet pipe or male connectors or bolt 358. Many refuse to try backweld the flange, others try and fail to get a lead-tight weld, while only a few have mastered an expensive technique to accomplish a good weld 360.

Finally, another problem encountered is leakage of commonly used TFE gasket 362 (FIG. 10b), especially after the system has undergone significant temperature cycling, e.g., 32° F. up to 180° F. and back to 32° F. The coefficient of thermal expansion of TFE gasket 362 is about 10 times greater than steel. Consequently, as the system temperature raises, gasket 362 will expand more than its metal retailer grooves 364 in flange 350, which means it will extrude into central space 360 between the port 102 and flange 350. As the system cools, the "memory" of TFE gasket 362 is insufficient to allow it return to its original shape, so leakage results. To stop leakage, bolts 358 must be tightened or a new gasket 364 installed.

Figure 12:
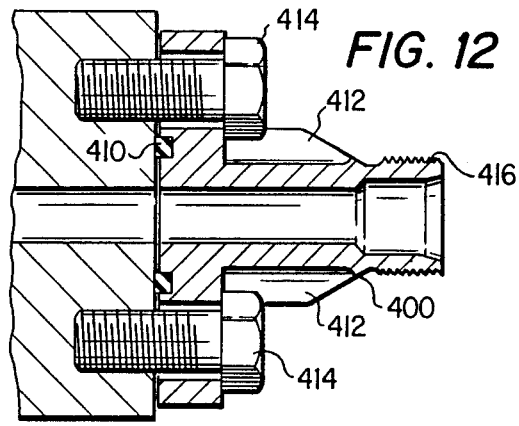
FIG. 12 is a partially broken away side view of the adapter of the present invention.

Referring now to FIGS. 11a-c and 12, an additional feature of the invention includes a one-piece interface module 400 which can be cast, forged and/or machined to a particular shape to satisfy certain cosmetic and functional parameters. The flange portion 402 has provision for two bolt holes 404 about 1⅝ inch apart equally spaced on either side of the centerline of interface module 400. Upon surface 406 is machined groove 408, which is dimensioned to receive a gasket or packing ring 410 (FIG. 12). FIG. 11b illustrates recesses 412, which allow the insertion of a box end wrench over the bolts 414. Bolts 414 pass through holes 404 to fasten the interface module on to an appropriate instrument. The length of recesses 412 must be sufficient to allow insertion of a standard box and wrench or a deep-well socket over the heads of bolts 414. Preferably, recess 414 is about 0.820 inch long to allow this clearance for a ⅜ inch bolt. Appropriate diameters, dimensions, surface finishes, etc. of threaded end 416 are provided to accept conventional nut 418 and ferrule 420.

Referring now to FIG. 13, with exception to threaded end 416 and the nut 418 and ferrule 420, the description of interface module 400 above also applies to the weld-type interface module 450. Interface module 450 is designed with a socket weld cavity 452 to receive a ½ inch pipe to be welded in place. This arrangement completely eliminates the backweld problems shown in FIG. 10c and explained above.

Referring to FIG. 14, a further embodiment includes interface module 460, which includes all features of adapters 400 and 450 above, except cavity 462 is properly tapped for ½ inch NPT. This allows use of male tubing connectors, but without the interference of box-end wrench problems shown in FIGS. 10a-c and explained above.

My modular interface system of FIGS. 11a-14 includes a solid, one-piece adapter to take the place of the old two-piece system shown in FIGS. 2 and 10a-c. Even though it looks like a simple piece of hardware, it is the result of research and development involving several parameters in several possible methods of use.

A further embodiment of the invention is shown in FIG. 15. Interface modules 470 have ½ inch NPT male pipe ends 472. This embodiment facilitates mounting an instrument 473 directly on a ½ inch NPT threaded ports 474 on meter run orifice flanges 476 o any other threaded outlet on pipes, vessels or industrial equipment. The one-piece, compact profile of interface module 470 results in an interface module that is strong enough to withstand the continued stress of industrial environment while supporting the weight of my transmitter/manifold or even much bigger instruments. The old two-piece flange and nipple system (FIGS. 2 and 10a-c) suffers a bad reputation today because of incidents of very serious process blow-outs resulting from sudden fracture of the nipple 60 (FIG. 2). These fractures proved to be the result of metal fatigue often traceable to improper use of lightweight (schedule 40) nipples. Consequently, most users have removed from their list of approved procedures the use of the two-piece flange and nipple system for direct instrument mounting to orifice flanges, vessels, etc. If the user wishes to close mount the instrument, he is now required to provide a separate 2" pipe support system, which ruins the economics of close coupling.

The embodiment of FIG. 15 includes the features of the above interface modules, except special provision is made to allow side by side insertion of two interface modules 470 into the two ports 474, which are typical to what is found on orifice meter runs. Since orifice flanges 476 and their associated gaskets vary in thickness, and ports 474 are not drilled exact, the spacing of centerlines 478 can vary about ¼ inch from the standard fixed 2⅛ inch centerline 480 dimensions. If the threaded ends 472 of two interface modules are to screw into the meter run with variable centerlines, and transmitter/manifold 473 with fixed centerlines is to bolt onto the interface modules and seal pressure, three conditions must be satisfied simultaneously:

1. The ends 472 of both interface module 470 must be screwed into the orifice flange ports 474 far enough to allow the ½ inch NPT threads to tighten and seal.

2. Simultaneously, the flange faces 482 of both interface modules must be sufficiently coplanar with respect to each other to allow gasket 484 to seal as the one flat face of transmitter/manifold 473 is bolted onto the two independent faces 482 of interface modules 470.

3. Simultaneously, bolts 486 and 91 must pass through bolt holes 488, whose centerlines vary, and screw into the mating threaded holes on the transmitter/manifold whose holes are on exactly 2⅛ inch centers 480.

On the old two-piece flange and nipple system (FIG. 2), it is required that all three of these conditions be accomplished simultaneously by utilizing only one variable—how far the threaded end of the nipple is screwed into the ½" NPT female connection on the orifice flange. The centerline adjustment (condition 3 above) is accomplished by having the female ½ inch NPT connection offset about ⅛ inch with respect to the bolt holes. The sequence required to satisfy conditions 1, 2, and 3 using the old two-piece system is as follows:

(a) Install nipples into flanges and tighten to hold pressure.

(b) Screw these assemblies into orifice outlets. Tighten to hold pressure.

(c) Lay straight edge across the faces of the two assemblies to determine which one needs screwing in further to form a flat gasket surface.

(d) Hold a transmitter/manifold up against the flat faces of the flanges and observe how much off the flange holes are with respect to the mating threaded bolt holes in the transmitter/manifold body.

(e) Experiment by screwing in, ½ turn at a time, the flange-nipple assembly to allow the eccentricity of its connection to shift the flange's bolt hole centerline dimension to a usable 2⅛ inch dimension.

The above procedure works if the installer is lucky and finds in step e that no further adjustment is needed to accomplish a 2⅛ inch bolt center dimension. If further adjustment is required, he will of course disturb the adjustment made in step c to satisfy flat gasket surface condition 2. Each one-half turn required of the flange yields a lateral thread movement of that flange surface forty-three thousandths (0.043") of an inch. So it is possible that in step c above, he could not get the flatness closer than forty thousandths (0.040") of an inch from one flange face to the other. If by chance the flange that needs screwing in further to satisfy centerline requirements of step 3 above happens to be the one that was already forced in more to satisfy condition 2 (step c), it will mean that after adjusting in step e that now the flatness requirement (condition 2) step c is far from satisfactory. Two one-half turns of one flange causes a thread engagement lateral movement of eighty-seven thousandths (0.087") of an inch—which is far too much out-of-flatness allowable for the flange gaskets to function. This means that the other flange-nipple assembly must be also forced in a full turn to bring the flatness within limits.

One of the basic facts a pipefitter soon learns is that, especially on exotic metal piping, he cannot always force a joint one full turn without thread galling. Thread galling here would mean that not only the nipple, but also the entire, very expensive meter run assembly is ruined and must be replaced or expensive back-welding repairs made in the field.

The interface module system of FIG. 15 was invented to eliminate these problems by the following features:

1. Interface adapter 470 is shaped such as to require only one pipe thread make-up instead of the one on each end of the nipple like the old design. Since it is very difficult to manufacture better than a half turn tolerance pipe threads, the two-piece design allowed a condition where both ends of the nipple could be a half turn deep or shallow which means the installed assembly could be one full turn shorter or longer than the standard. As explained above, this can lead to failure—especially if the pipefitter picked up one assembly that is one turn too short to mate with one that is one turn too long.

2. By virtue of being a one-piece design, the possibility is eliminated of a person mistakenly using a lightweight nipple and producing a hazard of the nipple being overstressed and breaking.

3. I have eliminated steps d and e above by providing elongated hole 488, which allows one-eight inch of side to side (horizontal) movement of bolts 486 to attain the 2⅛ inch bolt to bolt distance required to screw into the transmitter/manifold body. Thus, the system can be used when the distance between centerlines 478 is in the range of 1⅞ inch to 2⅜ inch. The need for the troublesome eccentric ½" NPT connection on the flange is eliminated on this embodiment, and only conditions 1 and 2 set forth above need to be controlled by the amount of thread engagement of each interface module. Condition 3 is automatically satisfied by the elongated holes 488.

As explained above with respect to FIG. 10b, a need presently exists for elimination of the TFE gasket 362 leakage after temperature cycling. There is a possibility that this problem will be enhanced by my new interface module system used as in FIG. 15 because by nature of its design, additional mechanical stress will be imposed on the gasket. Two interface modules 470 will be screwed side by side directly into orifice flange ports 474. The transmitter/manifold will then be bolted directly to the two interface modules with four bolts 486 and two seals 484. This results in the weight of the transmitter/manifold being imposed upon seals 484 in addition to the stress of the bolts to hold the pressure. As shown in FIG. 12, the gasket is positioned between the interface module and the transmitter/manifold such that all of the clamping compressive forces of the bolts must pass through gasket. If the interface modules support the weight of the transmitter/manifold as well as forces imposed by vibration, or even a person stepping on the transmitter/manifold while climbing on the equipment, the TFE gasket could easily be stressed into the 1000 PSI range which results in a 17% cold flow or creep in 100 hours at 200° F.

Considering the possibility of shock loads of 3 to 5 times this magnitude, it is clear that the TFE gasket design could present leakage problems if pushed too far.

Metal to metal mating between the interface module and the transmitter/manifold is desirable in that all of the loads of the transmitter/manifold will be transferred directly to the interface module without imposing any stress upon the seal. This of course, suggests standard o-ring seal technology. However, the chemical-petroleum industry is somewhat negative to o-ring seals because of incompatibility of o-ring elastomers and the users' chemicals. Most specifications by users call for 316 stainless steel parts and TFE seals. TFE will only work as an o-ring when special finishes are maintained on the mating parts and the o-ring. This is difficult, expensive, and in fact would be impossible to control in cases where my interface module would be used on some other supplier's transmitter.

Figure 16:
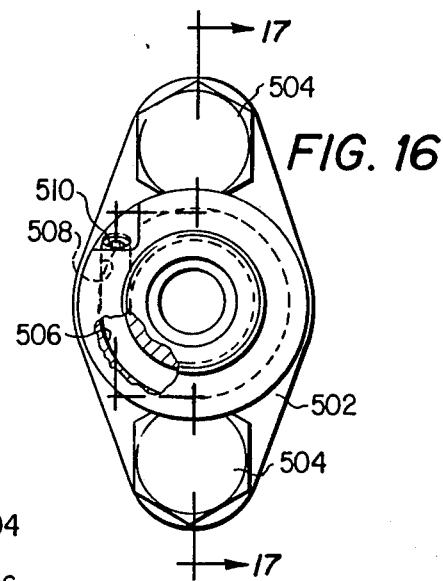
FIG. 16 is a partially broken away end view of the adapter of FIG. 12.
Figure 17:
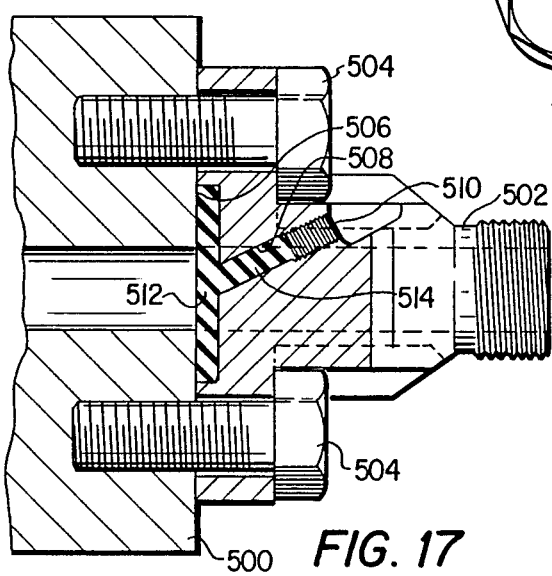
FIG. 17 is a sectional view taken along lines 17—17 of FIG. 16.

Referring to FIGS. 16 and 17, an additional embodiment of the invention includes instrument 500 onto which is bolted interface module 502 in a metal to metal fashion. Bolts 504 are torqued to standards set for good structural fastening of flanges, which allows excellent physical strength between instrument 500 and interface module 502. Provided on the face of adapter interface module 502 is a groove 506 which can be of any convenient outside diameter and whose cross-sectional thickness and width is about the same dimension and is about equal to 0.120 times the diameter. Intersecting groove 506 at any convenient angle is port 508, whose total volume minus about four threads of packing screw 510 is equal to about 20% of the total volume of groove 506. Port 508 is threaded with at least a 90% thread height for the full depth with a national fine thread pitch. Packing screw 510 is of equal pitch as port 508. Screw 510's thread is 90% or greater, and its head can be of any convenient size and configuration, but its distal end should be ground flat and square with no chamfer. This will leave the last thread very sharp and coming to a feather edge. Common machining practice would require this easily damaged feather edge be removed, but here it is needed to properly scrape the packing out of the threads of port 508 and push it down and away from the packing bolt threads. Also provided is a performed Grafoil ® ring 512 which is pressed to about 50 pounds per cubic foot density to conform to the dimensions of groove 510. Further provided is a round slug 514 of preformed Grafoil ® whose density is 35 to 50 pounds per foot and whose dimensions conform to port 508 diameter to allow an easy slip-in insertion. The length will equal to port 508 length minus about four threads.

The seal is assembled by placing the ring 512 in groove 506 and the slug 514 into port 508. Interface adapter 50 is then bolted to the instrument and packing screw 510 is tightened to the torque required to contain leakage—usually about 50% of the call-out torque specified for this bolt size in fastener tightening handbooks.

While specific embodiments of the present invention have been described in detail herein and shown in the accompanying drawings, it will be evident that various further modifications are possible without departing from the scope of the invention.

What is claimed is:

1. An interface adapter for connecting a differential pressure transmitter manifold to a pipeline, comprising:
   a body formed of a non-resilient material;
   a flange portion of said body having a planar flange surface and elongated, partially cylindrical walls perpendicular to the planar surface defining an upper hole and a lower hole extending perpendicularly from the flange surface, the holes being vertically spaced on opposite sides of a medial portion of the body and being elongated for side to side movement of the body with respect to bolts extending therethrough;
   walls machined in the planar flange surface defining a groove dimensioned to receive a packing ring;
   a bolt surface coplanar with the planar flange surface and being located in the medial portion of the body;
   a neck portion extending outwardly from the bolt surface;
   means for connection to the pipeline disposed upon the end of the neck portion; and
   the neck portion further including walls defining recesses associated with the holes, such that sufficient clearance is provided for a wrench placed over a bolt in one of the holes.

2. The interface adapter of claim 1 wherein the neck portion distal end includes a nut and ferrule to accept a tubing connection.

3. The interface adapter of claim 1 wherein the neck portion distal end is of socketweld configuration to allow insertion and welding thereon of a pipeline.

4. The interface adapter of claim 1 wherein the neck portion distal end is threaded to accept standard threaded pipe.

5. The interface adapter of claim 1 further comprising:
   a cylindrical wall defining a port intersecting the groove; and
   the port being at least partially threaded at an end opposite to the groove, such that sealing material may be placed in the groove and in the port, and the sealing material may be pressurized to seal the interface adapter to the transmitter manifold by tightening a threaded member in the threads.

* * * * *